(12) United States Patent
Lorenzo Rodriguez et al.

(10) Patent No.: US 9,126,614 B2
(45) Date of Patent: Sep. 8, 2015

(54) SHOPPING CART

(71) Applicant: Araven, S.L., Zaragoza (ES)

(72) Inventors: Victor Julián Lorenzo Rodriguez, Zaragoza (ES); Laura Manzanares Fernandez, Zaragoza (ES); María Martinez Hansen, Zaragoza (ES); Eric Modrego Cortés, Zaragoza (ES); Francisco Javier Aznar Peligero, Zaragoza (ES); Javier Layus Torijano, Zaragoza (ES); Elena Esteban Guallar, Zaragoza (ES); Blanca Savirón Cornudella, Zaragoza (ES); Isabel Gimeno Verdejo, Zaragoza (ES)

(73) Assignee: ARAVEN, S.L., Zaragoza (ES)

( * ) Notice: Subject to any disclaimer, the term of this patent is extended or adjusted under 35 U.S.C. 154(b) by 0 days.

(21) Appl. No.: 14/179,781

(22) Filed: Feb. 13, 2014

(65) Prior Publication Data
US 2014/0265184 A1    Sep. 18, 2014

(30) Foreign Application Priority Data

Mar. 14, 2013   (ES) .................................. 201350361

(51) Int. Cl.
*B62D 39/00*    (2006.01)
*B62B 3/14*    (2006.01)
(Continued)

(52) U.S. Cl.
CPC ............... *B62B 3/14* (2013.01); *B60B 33/0042* (2013.01); *B60B 33/0068* (2013.01); *B62B 3/1492* (2013.01); *B62B 5/061* (2013.01);
(Continued)

(58) Field of Classification Search
USPC ................ 280/33.991, 33.992, 47.34, DIG. 4
See application file for complete search history.

(56) References Cited

U.S. PATENT DOCUMENTS 2,234,358 A  *  3/1941  Schray ........................... 280/641
3,536,283 A     10/1970  Lowe
3,999,774 A  *  12/1976  Rehrig ...................... 280/33.991
(Continued)

FOREIGN PATENT DOCUMENTS

AT          360 346        1/1980
BE          1015808        9/2005
(Continued)

OTHER PUBLICATIONS

International Search Report mailed on Feb. 18, 2014 for corresponding International Application No. PCT/ES2013/070510.
(Continued)

*Primary Examiner* — Hau Phan
*Assistant Examiner* — Bryan Evans
(74) *Attorney, Agent, or Firm* — Ostrolenk Faber LLP

(57) ABSTRACT

The present invention relates to a shopping cart of the types used by shoppers in supermarkets and/or self-service stores or shops and of the types stored by being horizontally fitted into one another, which has several improved maneuverability and handling features and which basically comprises a basket (1) formed by a bottom (2) and four vertical side faces, one of which is a vertically swingable face (3) for the purpose of facilitating the horizontal fitting of another cart, a frame fixed to the bottom (2) of the basket (1) comprising four legs (6), each of which in turn comprises at least one wheel (7), and a perimetral handle (5) extending along the entire perimeter of the upper edge of the basket (1).

13 Claims, 5 Drawing Sheets

(51) Int. Cl.
*B62B 5/06* (2006.01)
*B60B 33/00* (2006.01)

(52) U.S. Cl.
CPC ........... *B60B2200/432* (2013.01); *B62B 3/146* (2013.01); *B62B 2501/065* (2013.01)

(56) References Cited

U.S. PATENT DOCUMENTS

| | | | |
|---|---|---|---|
| 4,545,591 A | 10/1985 | Balha | |
| 4,632,411 A | 12/1986 | Badger | |
| 5,542,687 A * | 8/1996 | Harris | 280/33.993 |
| D444,281 S | 6/2001 | Gaze et al. | |
| 7,600,763 B2 | 10/2009 | Splain et al. | 280/33.992 |
| 8,056,909 B2 * | 11/2011 | Burdwood et al. | 280/33.991 |
| 2003/0160407 A1 | 8/2003 | Lantz | |
| 2007/0063464 A1 | 3/2007 | Splain et al. | |
| 2009/0174161 A1 | 7/2009 | Alves et al. | 280/47.35 |

FOREIGN PATENT DOCUMENTS

| | | |
|---|---|---|
| EP | 1 403 164 A1 | 3/2004 |
| EP | 2 439 125 | 4/2012 |
| ES | 1 016 651 | 11/1991 |
| ES | 1 027 023 | 7/1994 |
| ES | 2 225 564 | 3/2005 |
| ES | 2 270 676 | 4/2007 |
| ES | 2 288 138 | 12/2007 |
| KR | 2012 0007593 | 1/2012 |
| WO | WO 97/30880 | 8/1997 |
| WO | WO 2007/141417 | 12/2007 |

OTHER PUBLICATIONS

Spanish Search Report dated Jun. 13, 2013 for corresponding Spanish Application No. 201330361.

* cited by examiner

SHOPPING CART

OBJECT OF THE INVENTION

The present invention relates to a shopping cart of the type used by shoppers in supermarkets and/or self-service stores or shops where these carts can be moved through the entire retail establishment, selecting products.

More specifically, the present invention relates to a cart provided with features giving it greater maneuverability and easier and more comfortable handling which further maintains the features which allow fitting it horizontally into other carts for storage when not in use.

BACKGROUND OF THE INVENTION

A large variety of devices are known and used today to aid shoppers to transport selected items to the cashier in shops and/or supermarkets.

One example of said devices are conventional carts, such as those disclosed by ES2225564 for example, which allow holding a large number of products and which are logically provided with wheels so that the shoppers can push the carts rather comfortably.

However, such carts have serious drawbacks. The considerable size of the carts must be pointed out among said drawbacks because, even though it is their greatest attribute as it allows holding products that are bulky and in large quantities, it is also their greatest drawback since once loaded, these products greatly complicate their maneuverability and handling. Said maneuverability is particularly compromised when making turns in supermarket aisles or when avoiding other carts, shelves, etc., since the design thereof makes overcoming the inertia by simply pulling on the handgrip located on the higher and narrower side difficult.

Said lack of maneuverability sometimes causes shoppers to stop using the handle designed for such purpose to turn the cart and to grip one of the larger lateral sides of the cart however they can to turn the cart either by pulling the cart if shoppers grip the side of the cart towards where they intend to turn the cart or by pushing the cart if shoppers grip the opposite side of the cart, which often tends to cause faulty control due to the difficulty of said gripping.

To facilitate said gripping, carts such as that described in U.S. Pat. No. 7,600,763 are known where the cart is provided with a perimetral handle. Nevertheless, such carts still have serious drawbacks, such as the lack of symmetry or the fact that not all the wheels of the cart are free wheels or directional wheels. Furthermore, the existence of a lower perimetral platform limiting the useful space for the shopper's feet tends to be a problem and cause impacts if said cart is gripped on one of the sides that is not the usual side.

Smaller baskets appeared on the market a few years ago in order to overcome said drawbacks. Said baskets were initially intended for small shops or for large retail establishments when the shopper wanted to buy a few items, so the shopper had to carry or transport the items holding the baskets up. Then, said baskets were developed such that they allowed holding more items while at the same time facilitate their transport, so wheels or rolling elements were incorporated on the base thereof which allowed carrying them in a manner parallel to the floor or in a manner inclined with respect to the floor, as can be seen in ES2270676 or ES2288138 belonging to the same applicant as the present invention or in ES1016651U or ES1027023U, respectively.

However, even though said baskets improve maneuverability due to their reduced size and capacity, they also have drawbacks typical of their morphology, such as the lower holding capacity, the need to bend down for putting in or picking up the items held therein, among others.

Furthermore, such baskets can have drawbacks typical of the way they are stored, since stacking them in height can entail a problem for elderly shoppers or shoppers with any type of physical limitation.

Finally, to solve some of the mentioned problems, solutions such as that proposed in EP1403164 and/or US2009174161 have appeared on the market, where two baskets, an upper basket and another lower basket, are incorporated to a rigid vertical structure or frame in a non-permanent manner, thus improving the total capacity and part of the maneuverability problem, but not the storage problem in the non-operating phase, where it is necessary to remove said baskets to ensure that they do not take up too much space when fitted with one another. Furthermore, the fact that the frame and the baskets are independent can cause stability problems or can even cause the baskets to fall if they are not correctly positioned on said frame. On the other hand, the basket located in the lower portion still has the same accessibility problems.

Based on the foregoing, it would be desirable to have a device for transporting items inside shops and/or supermarkets or self-service stores which prevents the mentioned drawbacks of the prior art. Specifically, a device which is comfortable and can be easily controlled and handled from any position of its perimeter without forsaking good capacity, which does not require great physical efforts by the shopper for the transport thereof and which maintains a good horizontal storage capacity in the retail establishment, taking up the smallest possible space when they are fitted to one another, is desirable.

DESCRIPTION OF THE INVENTION

The shopping cart of the present invention solves the problems of the state of the art mentioned above since it is converted into an effective device having considerable capacity which is very easy to handle and maneuver while shopping and allowing easy horizontal fitting, making maximum use of the space existing in the retail establishment.

Said maneuverability or ease of handling, the main objective of the present invention, is evidenced by the fact that the cart of the invention is structured such that the shopper finds no difference when handling the cart from any of its sides. In other words, the structure of the cart enables the shopper to handle it indistinctly from any of its sides without losing maneuverability, which will allow grabbing the cart without problems for handling regardless of the position of the cart while shopping.

To that end, the shopping cart of the present invention is structured such that it comprises:

A basket formed by a bottom and four side faces extending upwards from said bottom, one of the side faces being vertically swingable for the purpose of facilitating the passage of another cart located therebehind in the horizontal fitting operation of the carts.

For the purpose of improving maneuverability of said basket and particularly for achieving said maneuverability by pushing the basket from any of its sides, the body of the basket is circumscribed in a square, without actually being a square per se due to the small tapering which said basket has in the horizontal axis for the purpose of facilitating said horizontal fitting between carts.

Therefore, due to its virtually square shape, the center of gravity thereof is also located virtually in the center, at the same distance from all its faces with the small variation due to the tapering indicated above. Evidently, this greatly facilitates handling while at the same time hugely favors the main purpose of the invention which is to enable the shopper to handle the cart with the same ease from any of the sides thereof.

FIG. 1 schematically shows the difference in the position of the center of gravity between the cart of the invention and the carts of the state of the art mentioned above which are circumscribed in a rectangle, also with a small tapering to allow the horizontal fitting between them.

As can be seen in said figure, in the case of the present invention the center of gravity (COG) is located in the center of the square in which the basket is circumscribed, such that the distance d1 between said center and the side faces is virtually identical to the distance between said center and the front and rear faces d2 and d3.

However, as can be seen in said figure, in the case of conventional carts forming the state of the art, the basket is circumscribed in a rectangle, so the COG is located at a point such that the distance d1 between said center and the side faces is much less than the distance between said center and the front and rear faces d2 and d3, which translates into the fact that when the shopper pushes the cart from any of the two smaller sides, he/she must overcome a greater moment of inertia when making turns, i.e., maneuvering and controlling the cart from any of those two smaller sides will be more complicated, this being further evidenced when the cart is filled with items.

A perimetral handle extending along the entire upper perimeter of the basket and located on said perimeter in the vertical prolongation of each of the side faces.

Said perimetral handle will therefore facilitate grabbing the cart from any point, and hence handling it, regardless of which of the four faces of the basket the shopper decides to push or pull said cart from.

In addition to the foregoing, the fact that said perimetral handle does not protrude from any of the faces will also provide additional advantages such as a reduction in the space taken up by the carts when they are stored fitted on one another, or when they are in the operating phase, as well as the reduction in the risk of impacts with shoppers since they do not have sharp edges or protruding points.

On the other hand, the fact that said perimetral handle does not protrude from the upper perimeter of the basket means that the shopper will grip on the cart from a point closer to the center where the load is located, which entails a reduced moment of inertia and therefore less effort in handling it, particularly when it is filled with items.

Finally, the attempt has been made to ensure that the perimetral handle is virtually horizontal so the shopper is also equally attracted by all the sides of the cart. In other words, the distance between the highest and lowest points of the perimetral handle is minimum, or in other words, the difference in height between the section of the handle located on the side face where the swingable face is located and the section located on the opposite face or the leading face (given this name because this is the face that will be introduced first into the next cart when they are fitted one inside another horizontally) is minimum.

A support structure or frame for the basket which comprises four legs in its lower part, each of which in turn comprises at least one multidirectional rotating wheel or free wheel, also called "castor wheels".

Furthermore, said legs have the particularity that at the points of attachment with the wheels they form, with respect to one another, an isosceles trapezoid-shaped imaginary horizontal plane the larger base of which is located below the side face of the basket forming the swingable face and the smaller base is located at the opposite end below the face of the basket that acts as a leading face when introducing one cart into another during horizontal stacking. As a result of this particular shape, the frame and the legs will also allow fitting one cart into another when performing said stacking.

On the other hand, said legs are structured such that they converge towards a central point so they are not attached to one another at any point of the perimeter of the isosceles trapezoid-shaped imaginary horizontal plane mentioned above, thus leaving the space between the wheels free, which will prevent the shopper from running over his/her own feet regardless of his/her position, i.e., regardless of which side the shopper decides to push the cart from, said cart can thus be moved without difficulty from any position, only requiring that said position is the conventional position at the time of stacking the carts.

Likewise, for the purpose of preventing interference between the attachment of said legs with the shopper's feet, the legs will be attached to one another in at least one point located in a plane which is higher than the mentioned isosceles trapezoid-shaped imaginary horizontal plane and the vertical projection of which will be internally centered in an approximate manner both on the face forming the bottom of the basket and on the truncated pyramid-shaped imaginary plane defined by the points of attachment between the legs and the wheels.

Nevertheless, the preceding structure intended for favoring handling by the shopper has a problem that must be solved.

Specifically, the fact that the perimetral handle is substantially horizontal means that the leading face has a height which is very similar to the opposite swingable face. Therefore, during the storage operation when one cart is fitted with another, if the axis about which said swingable door pivots is not high enough, the leading face is very close to the axis and there is therefore a need to exert great pressure for the swingable face to rotate about said axis and allow entry of another cart. In other words, the smaller the difference in height between the swingable face and the leading face, the greater the strength that must be exerted by the shopper to overcome the resistance of the swingable face.

This problem has been solved in the state of the art by hinging said swingable door at both sides on the highest available point of the side faces. However, in the cart of the present invention since the perimetral handle does not protrude outwards as in other carts of the state of the art, locating the hinging point in the usual place would mean locating it at a point where the distance between the leading face and said point would be very small, so the shopper must make an extra effort when fitting one cart into another horizontally during the storage operation.

However, the cart of the present invention solves said problem by hinging the swingable face at the highest possible point, i.e., on the actual perimetral handle in the section located over said swingable face, or in other words, in at least one point, intersection of the vertical prolongation of the swingable face and the perimetral handle.

DESCRIPTION OF THE DRAWINGS

To complement the description that is being made and for the purpose of aiding to better understand the features of the invention according to a preferred practical embodiment thereof, a set of drawings is attached as an integral part of said description in which the following has been depicted with an illustrative and non-limiting character.

PREFERRED EMBODIMENT OF THE INVENTION

Figure 1:
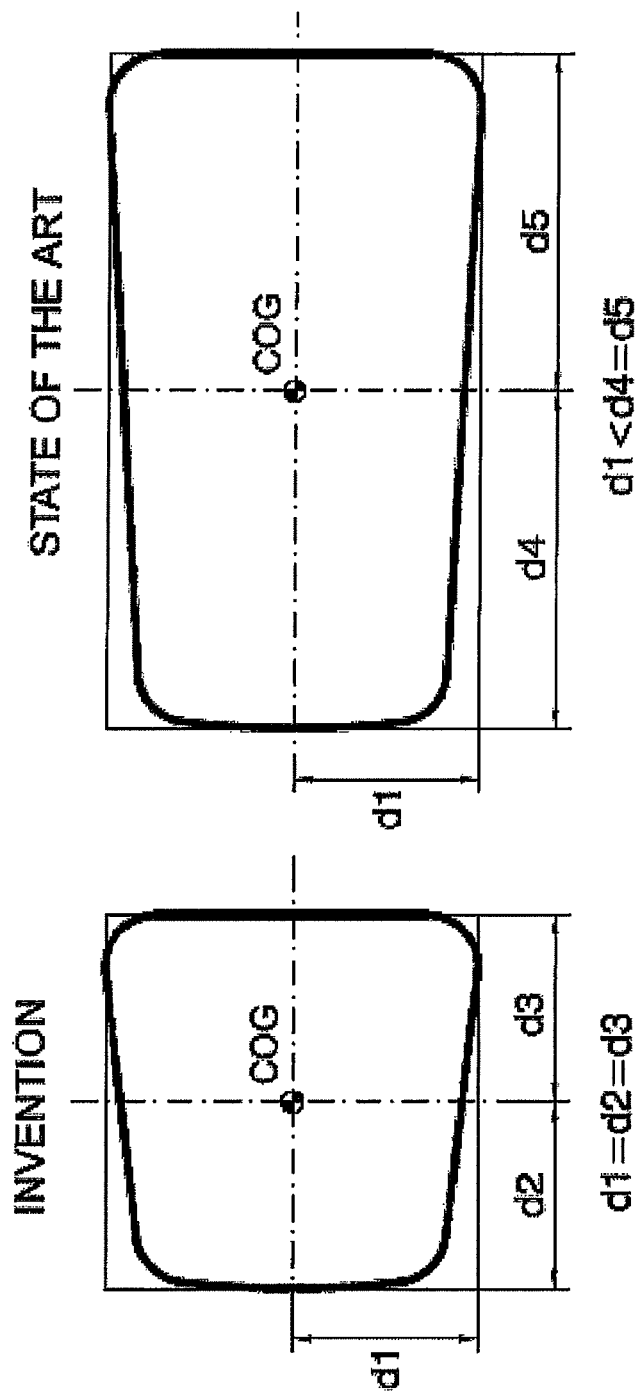
FIG. 1 shows respective schematic views comparing the position of the place where the center of gravity (COG) is located in the cart of the invention and in the carts known in the state of the art.
Figure 2:
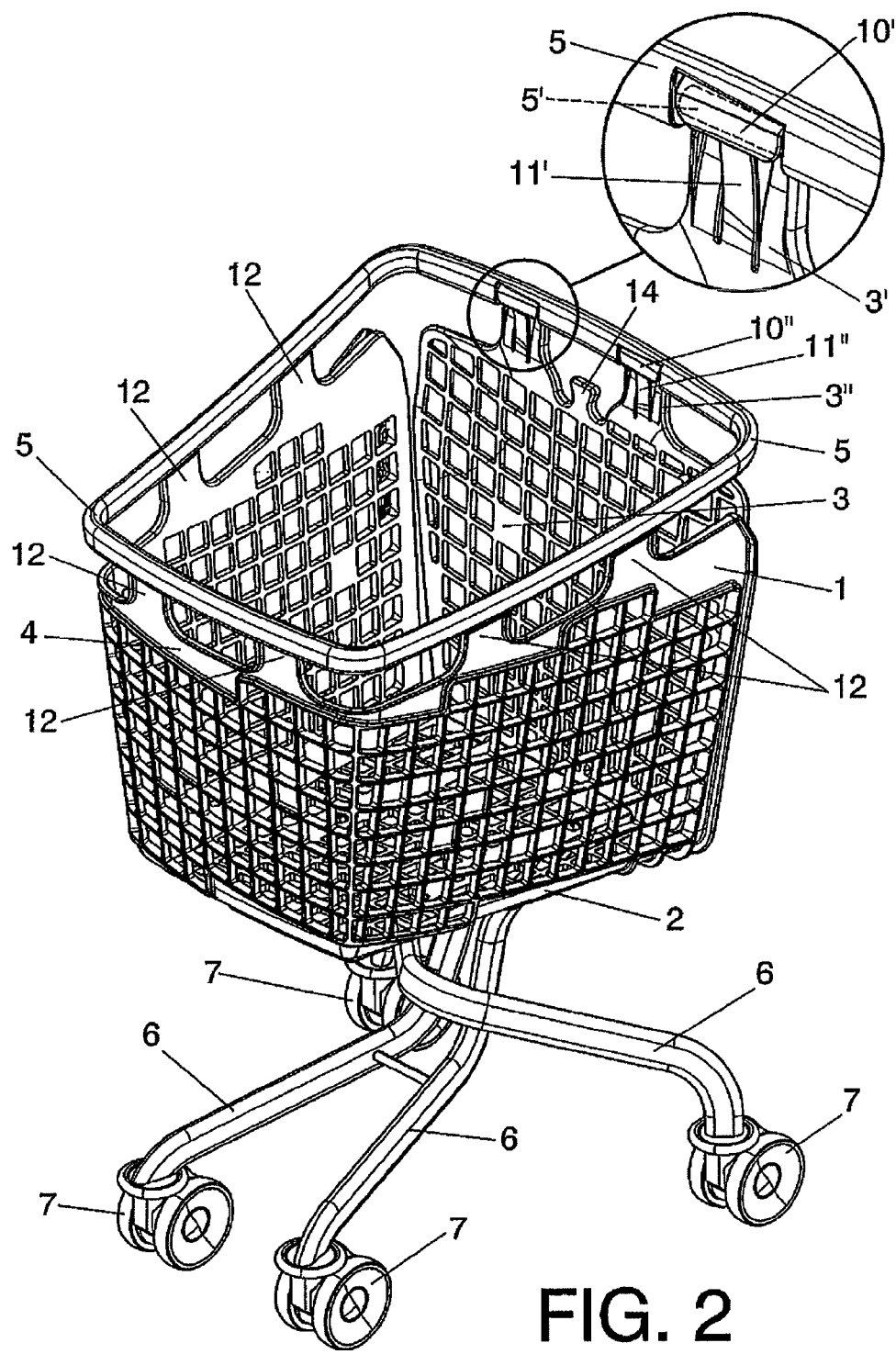
FIGS. 2 and 3 show respective perspective views of a shopping cart according to the preferred embodiment of the present invention, as well as a detailed view of the attachment between the swingable face and the handle.
Figure 3:
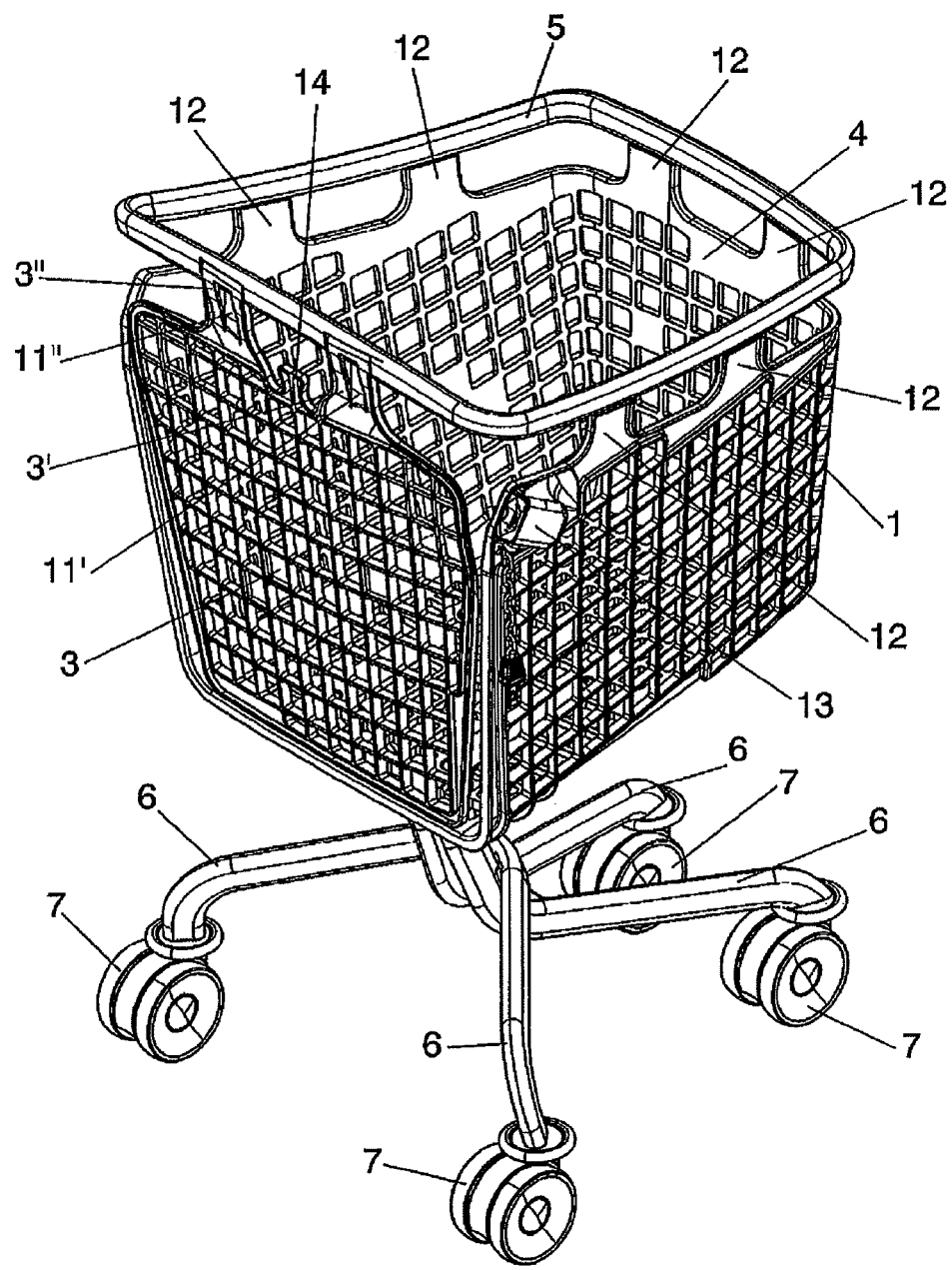

As seen in the drawings and according to a possible practical embodiment of the invention, the cart of the present invention comprises a basket (1) which is circumscribed in a square formed by a bottom (2) and four vertical side faces extending upwards from said bottom, one of the side faces being a vertically swingable face (3) for the purpose of facilitating the passage of another cart located therebehind in the horizontal storage or fitting operation of said carts.

According to a preferred embodiment, the basket (1) has a slight tapering along the horizontal axis for the purpose of facilitating the horizontal fitting between carts. Specifically regarding the vertical axis, said basket (1) has a truncated pyramid shape with a quadrangular section the larger base of which is located on the upper portion and the smaller base forming the bottom (2) of the basket is located in the lower portion. Regarding the horizontal axis, the basket (1) also has a truncated pyramid shape with a quadrangular section the larger base of which forms the swingable face (3) and the smaller base is located at the opposite end, which will act as the leading face (4) when introducing one cart into another during horizontal stacking.

It must be clarified that as it is used herein, the term "quadrangular" referring both to the general shape of the basket (1) and to the sections thereof according to a vertical and horizontal plane means that it is shaped like a square, without actually being a square per se, to enable the swingable side face (3) to swing far enough into the body of the basket (1) so as to allow the introduction of another shopping cart in the stacking phase.

According to that same preferred embodiment and as seen in the drawings, the body of the basket (1) has a perimetral handle (5) extending along the entire perimeter of its upper edge and located thereon, in what would be the imaginary vertical prolongation of each of the faces, without protruding from said vertical prolongation at all. In other words, each of the four sections which form said perimetral handle (5) will be located above and in the vertical prolongation of each of the corresponding four faces of the basket (1).

Furthermore according to said embodiment, the perimetral handle (5) is structured such that the difference between the distance to the ground from its lowermost point or with the lowest level and the point with the highest level or the uppermost point is very small, thus preventing the shopper from noticing too much of a difference in height of said handle if he/she decides to grip the lowermost section located on the smaller face or leading face (4).

On the other hand and according to a possible embodiment of the invention, the perimetral handle (5) is attached to the basket (1) by means of ribs (12) strategically placed so as to not obstruct handling, regardless of the face from which the shopper decides to push or pull the cart. Therefore and as seen in the embodiment of the drawings, said ribs (12) are not located in any of the four corners of the basket (1), leaving them free in case the shopper decides to move the cart towards him/herself before positioning it for pushing.

On the other hand and as mentioned above, since it is necessary for the leading face (4) to be as high as possible and the variation in the vertical level of the perimetral handle (5) to be the smallest possible in order to gain capacity, this forces the swingable face (3) to be hinged on the highest possible point so that the leading face (4) pushes the swingable face (3) at a point as far away as possible from the swing axis and therefore, the shopper needs less strength to overcome resistance when fitting one cart inside another during the storage operation.

According to the preferred embodiment of the invention, this is achieved by hinging the swingable face (3) in at least one point of the section of the perimetral handle (5) located in the vertical prolongation of said swingable face (3).

According to different embodiments, said hinging can consist of either a vertical extension of the actual swingable face (3) or any independent element integral therewith forming the prolongation of said face (not depicted).

Figure 5:
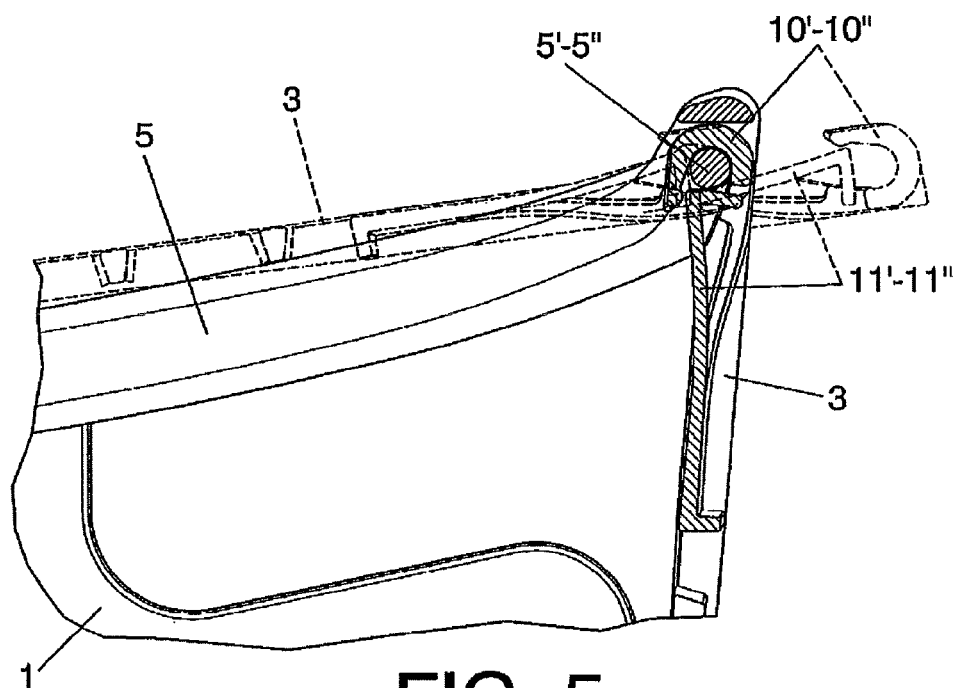
FIG. 5 shows a cut-away view of a possible embodiment of the hinging of the swingable face on the perimetral handle.

More specifically and according to a possible embodiment of the invention shown in the detail of FIG. 1 or in FIG. 5, the hinging between the swingable face (3) and the perimetral handle (5) is done according to a clipping system allowing an easy assembly and disassembly and further comprising means for preventing the hinged attachment from accidentally coming loose.

More specifically and as can be seen in said drawings, a possible embodiment consists of the swingable face (3) comprising respective prolongations (3', 3") ending in respective open hooks (10', 10") intended for partially surrounding two sections (5', 5") of the perimetral handle (5) forming an attachment allowing one part to rotate with respect to the other such that it is possible to perform the hinging function and for the door to fold down.

Furthermore and as mentioned, the attachment has means for preventing the hinged attachment from accidentally coming loose, said means being respective flexible flanges (11', 11") which are pushed downwards by the sections (5',5") during the operation of assembling the swingable door (3) until, once the hooks (10', 10") are positioned on the sections (5',5"), said flanges (11', 11") are released, adapting their rest position which is also the lock position and prevents the swingable door (3) from being able to be removed by simply pulling it. Therefore, to unlock and to be able to remove the door (3), it will be necessary to again move said flexible flanges (11', 11") downwards such that they allow sliding the hooks (10', 10") in the opposite direction, which can be easily done manually and without the aid of any tool.

Finally, in order to prevent the shopper from being more inclined to push the cart from one face rather than from others, the perimetral handle (5) has a continuous appearance in the entire upper surface, including the sections (5',5") on which said handle has a type of shield. Therefore, the perimetral handle only loses continuity on its inner face, lower face and outer face in said sections (5',5"), but not on the upper face, so the perimetral handle (5) would be completely continuous if seen from above.

On the other hand, as seen in the drawings, the cart of the invention comprises a support structure or frame to which the outer part of the face acting as the bottom (2) of the basket (1) is fixed in the upper part thereof by means of any suitable conventional system. This allows the assembly to be modular such that both elements can be replaced in the event of wear, cleaning, etc., or even replacing the basket (1) with another improved version thereof.

Said frame in turn comprises in the lower portion at least three legs (6), preferably four, each of which in turn comprises at least one multidirectional rotating wheel (7) or free wheel, also called "castor wheels".

According to the preferred embodiment of the invention and as can be seen in the drawings, said legs (6) together form an isosceles trapezoid-shaped imaginary horizontal plane at the points of attachment with the wheels (7) the larger base of which is located below the face of the basket forming the swingable face (3) and the smaller base is located at the opposite end below the leading face (4) to allow fitting one cart into another when stacking.

Furthermore, to prevent any part of the frame from running over or impacting the shopper's feet, the legs (6) thereof are structured such that:

they converge towards a central point so they are not attached to one another at any point of the outer perimeter of the isosceles trapezoid-shaped imaginary horizontal plane mentioned above defined by the lower ends or points of attachment with the wheels (7), thus leaving the space between said wheels (7) free as can be seen in the drawings; and the legs are attached to one another in at least one point located in a plane which is higher than the imaginary horizontal plane defined by the wheels (7), providing stability and resistance to withstand the weight of the basket, and wherein the vertical projection of said point of attachment will be centered in an approximate manner both on the bottom (2) of the basket (1) and on the isosceles trapezoid-shaped imaginary plane defined by the points of attachment between the legs (6) and the wheels (7).

Regarding the actual body of the basket (1), it is common in the state of the art for the basket to be formed by a plurality of horizontal ribs (8) and vertical ribs (9) forming the conventional grid structure which allows reducing the weight of the assembly, saving material, facilitating cart cleaning and allowing seeing the load. Furthermore, said ribs are usually flat on the inner faces of said basket (1) where the items are located to prevent snagging the items, which could break or dent them. However, this flat configuration of the ribs tends to cause problems when they are also flat on the outer face of the basket (1). Specifically, said problems arise when fitting one cart into another during the storage operation since the contact of all those ribs (8, 9) produces high friction both between the side faces of the fitted carts and between the leading faces and swingable faces.

Figure 6:
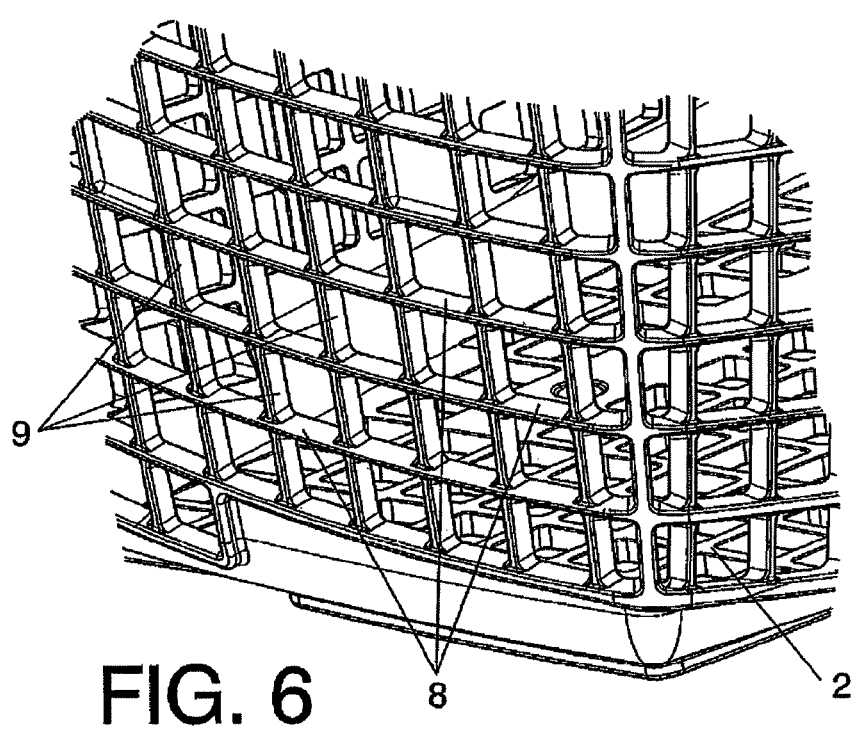
FIG. 6 shows a detailed view of the horizontal and vertical ribs forming the basket of the cart of the present invention.

To reduce said friction and according to another possible embodiment of the cart of the invention which can be seen in FIG. 6, said ribs are structured such that, on the side faces, the horizontal ribs (8) protrude with respect to the vertical ribs (9), reducing friction and eliminating possible transverse interference while at the same time the horizontal ribs (8) act as a guide. Likewise, in the swingable face (3) the vertical ribs (9) protrude with respect to the horizontal ribs (8) also for eliminating possible interferences and for facilitating or guiding the pushing of said swingable face (3) by means of the leading face (4).

On the other hand, the cart of the invention will have a coin lock (13), preferably located on one side of the basket (1) and not on the perimetral handle (5) so that none of the sections of said perimetral handle will be indicated a priori as the most suitable section suitable for using the cart.

Likewise, the basket (1) will incorporate a hook (14) for hanging bags for the purpose of facilitating the transport thereof without having to introduce them into the basket, taking up space and experiencing wear due to contact or crushing of the items placed therein.

Figure 4:
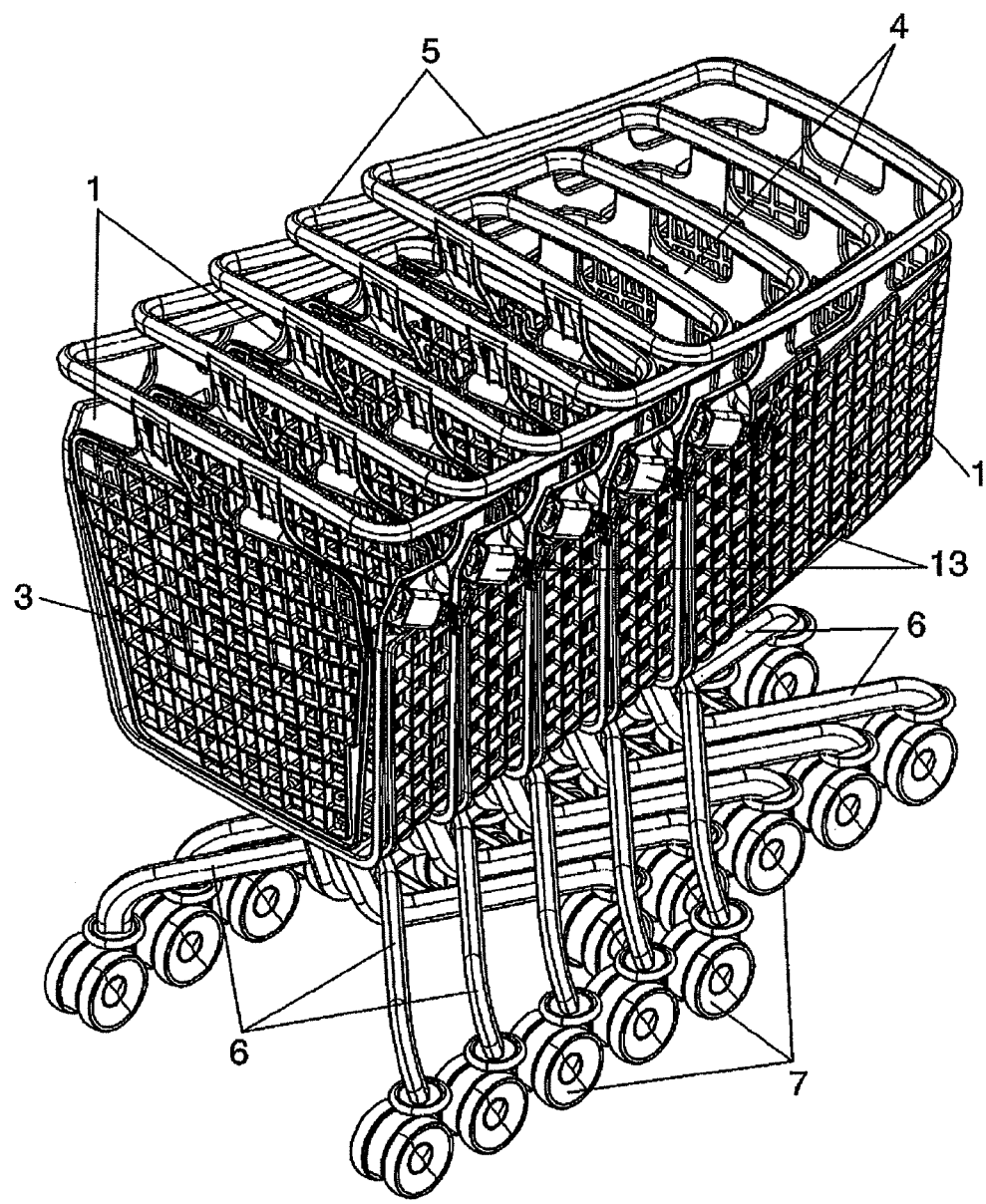
FIG. 4 shows a perspective view of several shopping carts fitted into one another according to the preferred embodiment of the present invention.

Finally, FIG. 4 shows several shopping carts according to the preferred embodiment of the present invention stacked horizontally one inside another. As can be seen, the swingable face (3) of the first shopping cart swings completely into the respective body of the basket (1), such that it allows introducing the second shopping cart therein.

The shopping cart of the present invention can be manufactured from any suitable resistant material. For example, the body of the basket (1) is manufactured from a suitable plastic, such as polypropylene, whereas the perimetral handle (5) can be manufactured from any type of plastic and the frame and/or legs from a suitable metal or another material that is resistant enough.

The invention claimed is:

1. A shopping cart comprising:
a basket having a tapering along the horizontal axis for the purpose of facilitating the horizontal fitting between carts, formed by a bottom and four vertical side faces one of which is a vertically swingable face for the purpose of allowing the passage of another cart during said fitting;
a frame fixed to the bottom of the basket comprising at least three legs each of which in turn comprises at least one wheel; and
a continuous perimetral handle extending along the entire perimeter of the upper edge of the basket, located thereon, and connected to the upper edge of the basket at a plurality of first locations and spaced from the upper edge of the basket at a plurality of second locations;
wherein the perimetral handle is located in the vertical prolongation of each of the faces of the basket, and wherein upper surface of the perimetral handle has a continuous appearance along perimetral handle's entire body when viewed from above.

2. The shopping cart according to claim 1, wherein the swingable face is hinged in at least one point of the section of the perimetral handle located in the vertical prolongation of said swingable face.

3. The shopping cart according to claim 1, wherein the swingable face comprises respective prolongations ending in respective open hooks, intended for partially surrounding two sections of the perimetral handle forming a hinged attachment allowing one part to rotate with respect to the other.

4. The shopping cart according to claim 3, wherein the hinged attachment has means for preventing the hinged attachment from accidentally coming loose.

5. The shopping cart according to claim 4, wherein the means for preventing the hinged attachment from accidentally coming loose comprise respective flexible flanges which are pushed downwards by the sections during the operation of assembling the swingable door until, once the hooks are positioned on the sections, said flanges are released, adapting their rest or lock position.

6. The shopping cart according to claim 3, wherein the perimetral handle has a shield on the sections to define the continuous appearance along the entire upper surface of the perimetral handles.

7. The shopping cart according to claim 1, wherein the legs together form an isosceles trapezoid-shaped imaginary horizontal plane at the points of attachment with the wheels, and in that the legs are not attached to one another at any point of the outer perimeter of said imaginary horizontal plane, but rather they converge towards a central point, being attached to one another at a point located in a plane which is higher than the imaginary horizontal plane.

8. The shopping cart according to claim 1, wherein the wheels are castor wheels.

9. The shopping cart according to claim 1, wherein the basket is formed by a plurality of horizontal ribs and vertical ribs forming a grid structure, wherein the horizontal ribs protrude with respect to the vertical ribs on the side faces of said basket, whereas the vertical ribs protrude with respect to the horizontal ribs on the swingable face.

10. The shopping cart according to claim 1, wherein the perimetral handle is attached to the basket by means of ribs which are not located in any of the four corners of the basket, leaving them free.

11. The shopping cart according to claim 1, wherein the basket is circumscribed in a square.

12. The shopping cart according to claim 1, wherein it has a coin lock located on one side of the basket.

13. The shopping cart according to claim 1, wherein the basket incorporates a hook for hanging bags.

* * * * *